United States Patent
Chin et al.

(10) Patent No.: US 6,272,651 B1
(45) Date of Patent: Aug. 7, 2001

(54) SYSTEM AND METHOD FOR IMPROVING PROCESSOR READ LATENCY IN A SYSTEM EMPLOYING ERROR CHECKING AND CORRECTION

(75) Inventors: Kenneth T. Chin, Cypress, TX (US); Clarence Kevin Coffee, Pembroke Pines, FL (US); Michael J. Collins, Tomball, TX (US); Jerome J. Johnson; Phillip M. Jones, both of Spring, TX (US); Robert Allen Lester, Houston, TX (US); Gary J. Piccirillo, Cypress, TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/135,274

(22) Filed: Aug. 17, 1998

(51) Int. Cl.$^7$ .................................................. G06F 11/00
(52) U.S. Cl. ................................................. 714/43; 714/9
(58) Field of Search .................................. 714/9, 43, 56; 710/129

(56) References Cited

U.S. PATENT DOCUMENTS

| | | | |
|---|---|---|---|
| 5,430,747 | * 7/1995 | Jibbe ..................................... | 714/811 |
| 5,978,938 | * 11/1999 | Kaiser ..................................... | 714/48 |
| 6,000,043 | * 12/1999 | Abramson .............................. | 714/44 |

OTHER PUBLICATIONS

Intel 450KX/GX PCIset, sections 1 and 3, copyright 1996.*

* cited by examiner

Primary Examiner—Robert W. Beausoliel, Jr.
Assistant Examiner—Bryce P. Bonzo
(74) Attorney, Agent, or Firm—Conley, Rose & Tayon, PC; Robert C. Kowert

(57) ABSTRACT

A computer is provided having a system interface unit coupled between main memory, a CPU bus, and a PCI bus and/or graphics bus. A hard drive is typically coupled to the PCI bus. The system interface unit is configured to perform a data integrity protocol. Also, all bus master devices (CPUs) on the processor bus may perform the same data integrity protocol. When a CPU requests read data from main memory, the bus interface unit forwards the read data and error information unmodified to the processor bus bypassing the data integrity logic within the system interface unit. However, the system interface unit may still perform the data integrity protocol in parallel with the requesting CPU so that the system interface unit may track errors and possibly notify the operating system or other error control software of any errors. In this manner processor read latency is improved without sacrificing data integrity. Furthermore, the system interface unit may still track errors on processor reads. If the read request is from a device on a peripheral bus (AGP or PCI bus), then the system interface unit performs the data integrity protocol on the data and error bits before forwarding the read data to the appropriate bus.

19 Claims, 6 Drawing Sheets

SYSTEM AND METHOD FOR IMPROVING PROCESSOR READ LATENCY IN A SYSTEM EMPLOYING ERROR CHECKING AND CORRECTION

BACKGROUND OF THE INVENTION

1. Field of the Invention

This disclosure relates to a computer and, more particularly, to a system interface unit which improves processor read latency in a computer system employing data integrity functionality such as error checking and correction (ECC).

2. Description of the Related Art

Modem computers are called upon to execute instructions and transfer data at increasingly higher rates. Many computers employ CPUs which operate at clocking rates exceeding several hundred MHz, and further have multiple buses connected between the CPUs and numerous input/output devices. The buses may have dissimilar protocols depending on which devices they link. For example, a CPU local bus connected directly to the CPU preferably transfers data at a faster rate than a peripheral bus connected to slower input/output devices. A mezzanine bus may be used to connect devices arranged between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interconnect ("PCI") bus to which higher speed input/output devices may be connected.

Coupled between the various buses are bus interface units. According to somewhat known terminology, the bus interface unit coupled between the CPU bus and the mezzanine bus is often termed the "north bridge". Similarly, the bus interface unit between the PCI bus and the peripheral bus is often termed the "south bridge".

The north bridge, henceforth termed a system interface unit, serves to link specific buses within the hierarchical bus architecture. Preferably, the system interface unit couples data, address and control signals forwarded between the CPU local bus, the PCI bus and the memory bus. Accordingly, the system interface unit may include various buffers and/or controllers situated at the interface of each bus linked by the interface unit. In addition, the system interface unit may transfer data to/from a dedicated graphics bus, and therefore may include an advanced graphics port ("AGP"). As a host device, the system interface unit may support both the PCI graphics transfers on the AGP (e.g., graphics-dedicated transfers associated with PCI, henceforth is referred to as a graphics component interface, or "GCI"), as well as AGP extensions to the PCI protocol.

The reliability of data transfers between devices on the CPU local bus, mezzanine bus, peripheral bus, and main memory is of paramount concern to designers and users of computer systems. There are several types of data errors that may occur. For example, soft errors which are non-permanent and hard errors which usually are permanent may occur in the main memory devices. Soft errors are usually caused by radiation-induced switching of a bit in a memory cell, and usually this type of error causes no lasting damage to the memory cell. Hard errors are due to the unexpected deterioration or destruction of one or more memory cells. Static discharge or deterioration over time are often the source of hard errors. Generally, hard errors result in the defective memory device being replaced. Also, errors may occur during data transfers due to switching noise on the data bus, etc.

Data errors have a devastating result on the operation of the computer system, regardless of whether the error is a hard or soft memory error or a transfer error. Erroneous data or a bad program instruction may result. These errors can not be tolerated in some systems, such as servers which supply information to other computers and may be part of a critical system, like a banking system. To avoid the problems caused by memory errors, computer system designers often implement error checking within the system interface unit.

Parity checking is a common means of error checking. Parity checking involves, for example, storing a bit with every byte of information that indicates the internal consistency of that byte. Generally this is as simple as determining if there is an odd number of ones in the byte. Every time a byte is accessed, the parity bit is checked in the system interface unit to determine if the byte is consistent with the parity indication. If a parity error is found, system operation is usually halted since the results could be catastrophic.

However, many computer systems are used in applications that can not tolerate system operation being halted. A technique that is used in systems that cannot tolerate being shut down by parity errors is to store an error checking and correction (ECC) code with each word (double word or quad word) in memory. The ECC allows single bit errors, which would normally cause a parity error, to be detected and corrected without effecting system operation and multiple bit errors to be detected. Typical ECC systems only correct single bit errors. If a multiple bit error is detected, it is treated as a parity error and system operation may be interrupted. Often, if single bit errors are frequently being detected (and corrected) in the same memory area, it is an indication that more serious memory failures may soon occur in that memory area.

To implement parity or ECC, the system interface unit typically includes a data integrity functional unit. All data transfers from main memory pass through the data integrity unit within the system interface unit. For example, when data is written to main memory by a processor or a PCI master, the data integrity unit generates error information (e.g., ECC checkbits) for that data to be stored in main memory along with the data. If a processor requests a read from main memory, the system interface unit will receive the read data and error information bits associated with the read data. The system interface unit will then perform the data integrity function (e.g., parity or ECC) on the requested read data and error information. After the read data and error information have passed through the data integrity unit, the checked and/or corrected read data will then be forwarded by the system interface unit to the processor bus in order to satisfy the processor read request. Similarly, read data and error information will pass through the data integrity unit before being forwarded to the PCI bus to satisfy a PCI read request from main memory.

The advantage of providing data integrity functionality in the system interface unit is that data reliability is greatly enhanced for data transfers between the processor bus or peripheral buses and main memory. However, a disadvantage of including a data integrity function in the system interface data path is that data transfer latency may be increased. For example, a processor read from main memory may take one or more additional clock cycles to perform because it may take one or more clock cycles to perform the data integrity function on the data in the system interface unit before data can be passed to the processor bus. Mezzanine and peripheral bus read latencies may be similarly increased. Write latencies may also be increase because error information must be generated for the write data. Generating the error information (e.g., checkbits or parity bits) may take one or more clock cycles before the write data and error information can be written to main memory by the system interface unit.

The increased latency resulting from the data integrity function in the system interface unit for mezzanine and peripheral bus reads may not be that harmful in most computer systems since mezzanine and peripheral devices are often slower devices that can easily tolerate an additional clock period added to their read latency. Similarly, the increased write latency resulting from the data integrity function in the system interface unit may not be that harmful in most computer systems since writes may usually be posted thus freeing the CPU or other bus.

However, processor read latency is often critical. Modern processors operate at extremely fast cycle rates. Usually, a processor cannot continue operation until a requested read from main memory has been satisfied. Therefore, any increase in processor read latency is detrimental to the overall processor performance. Including data integrity functionality in the system interface unit data path from main memory to the processor bus results in a tradeoff between increased data integrity and increased read latency.

Both data integrity and performance are extremely important in high end computer systems such as servers. It would therefore be desirable to have a computer system that obtained the reliability advantages of having data integrity functionality but did not suffer the increased processor read latency discussed above.

SUMMARY OF THE INVENTION

The problems outlined above are in large part solved by a computer employing an improved system interface unit. The system interface unit is configured as a north bridge between a CPU local bus, and graphics bus (e.g., AGP), a peripheral bus (e.g., PCI bus) and a memory bus. The CPU bus can link at least one, and certainly more, CPUs and associated cache storage locations within those CPUs. Additionally, the memory bus links a memory controller within the system interface unit to system memory denoted as semiconductor memory. Examples of suitable system memory include, for example, DRAM or synchronous DRAM ("SDRAM"). If the graphics bus is an AGP bus, then it may be linked to the system interface unit by an AGP interface to effectuate, e.g., 66 MHz 1×AGP transfers or 133 MHz 2×AGP data transfers. The bus interface unit may maintain a PCI interface which is synchronous to the CPU interface and may support PCI burst cycles. The cache storage locations within one or more CPUs may be fully associative L1 caches. L2 caches may also be employed and coupled to the processor bus.

The system interface unit is configured to perform a data integrity protocol. Also, all bus master devices (CPUs) on the processor bus may perform the same data integrity protocol. When a CPU requests read data from main memory, the bus interface unit forwards the read data and error information unmodified to the processor bus bypassing the data integrity logic within the system interface unit. However, the system interface unit may still perform the data integrity protocol in parallel with the requesting CPU so that the system interface unit may track errors and possibly notify the operating system or other error control software of any errors. In this manner processor read latency is improved without sacrificing data integrity. Furthermore, the system interface unit may still track errors on processor reads. If the read request is from a device on a peripheral bus (AGP or PCI bus), then the system interface unit performs the data integrity protocol on the data and error bits before forwarding the read data to the appropriate bus. Typically devices on these buses do not have logic to perform the data integrity protocol themselves.

Broadly speaking, a computer comprising at least one processor coupled to a processor bus is contemplated. The processor may have data integrity logic for performing a data integrity protocol. The computer also includes main memory coupled to a system interface unit. The system interface unit includes error logic for performing the data integrity protocol. The system interface unit is also coupled to the processor bus and a first peripheral bus. The system interface unit may be configured to pass read data and error information from the main memory to processor bus without passing the read data and error information through the error logic. The system interface unit may also be configured to pass read data and error information from the main memory to the first peripheral bus by passing the read data and error information through the error logic. The computer may also include a hard drive coupled to the first peripheral bus.

By passing read data and error information from the main memory to the processor bus without passing through the error logic in the system interface unit, the system interface unit may pass the read data and error information to the processor bus at least one clock faster than if the read data and error information had been passed through the error logic. The error logic in the system interface unit may perform the data integrity protocol on read data and error information from the main memory that has been passed to processor bus in parallel with the processor that receives the read data and error information. The error logic may include error detection logic and error correction logic. The data integrity protocol incorporated in the error logic may be the Pentium® Pro data integrity protocol.

The first peripheral bus may be compliant with the Peripheral Component Interconnect (PCI) standard. The system interface unit may be further coupled to a second peripheral bus and may pass read data and error information from the main memory to the second peripheral bus through the error logic. The second peripheral bus maybe compliant with the Advanced Graphics Port (AGP) standard. The system interface unit may pass read data through queues to the processor and the first and second peripheral buses. The queues within the system interface unit associated with each bus may allow data to be passed concurrently to the processor and the first and second peripheral buses.

A method for improving processor read latency in a computer system employing a data integrity function is also contemplated. Broadly speaking, the method includes receiving in a system interface unit read data and error information from main memory in response to a read request. If the read request was from a device on a processor bus, read data and error information are passed to the processor bus before the data integrity function is performed in the system interface unit. Passing the read data and error information to the processor bus occurs at least one clock cycle faster than if the data integrity function was not bypassed in the system interface unit. The data integrity function is still performed on the read data and error information in the system interface unit regardless of what device requested the read data. If the read data was requested from a device on a peripheral bus, the read data is passed to the appropriate peripheral bus after the data integrity function is performed.

Performing the data integrity function may include performing error detection and error correction. The data integrity function may include the Pentium® Pro error checking and correction protocol. A method presently contemplated may also include performing the data integrity function in a processor on the read data and error information in parallel with performing the data integrity function in the system interface unit on the same read data and error information if the read requested is from a device on the processor bus.

The peripheral bus maybe the PCI bus. A method presently contemplated may further include passing read data to a second peripheral bus after performing the data integrity function if the read request was from a device on the second peripheral bus. The second peripheral bus may be an AGP bus.

BRIEF DESCRIPTION OF THE DRAWINGS

Other objects and advantages of the invention will become apparent upon reading the following detailed description and upon reference to the accompanying drawings in which.

Figure 1:
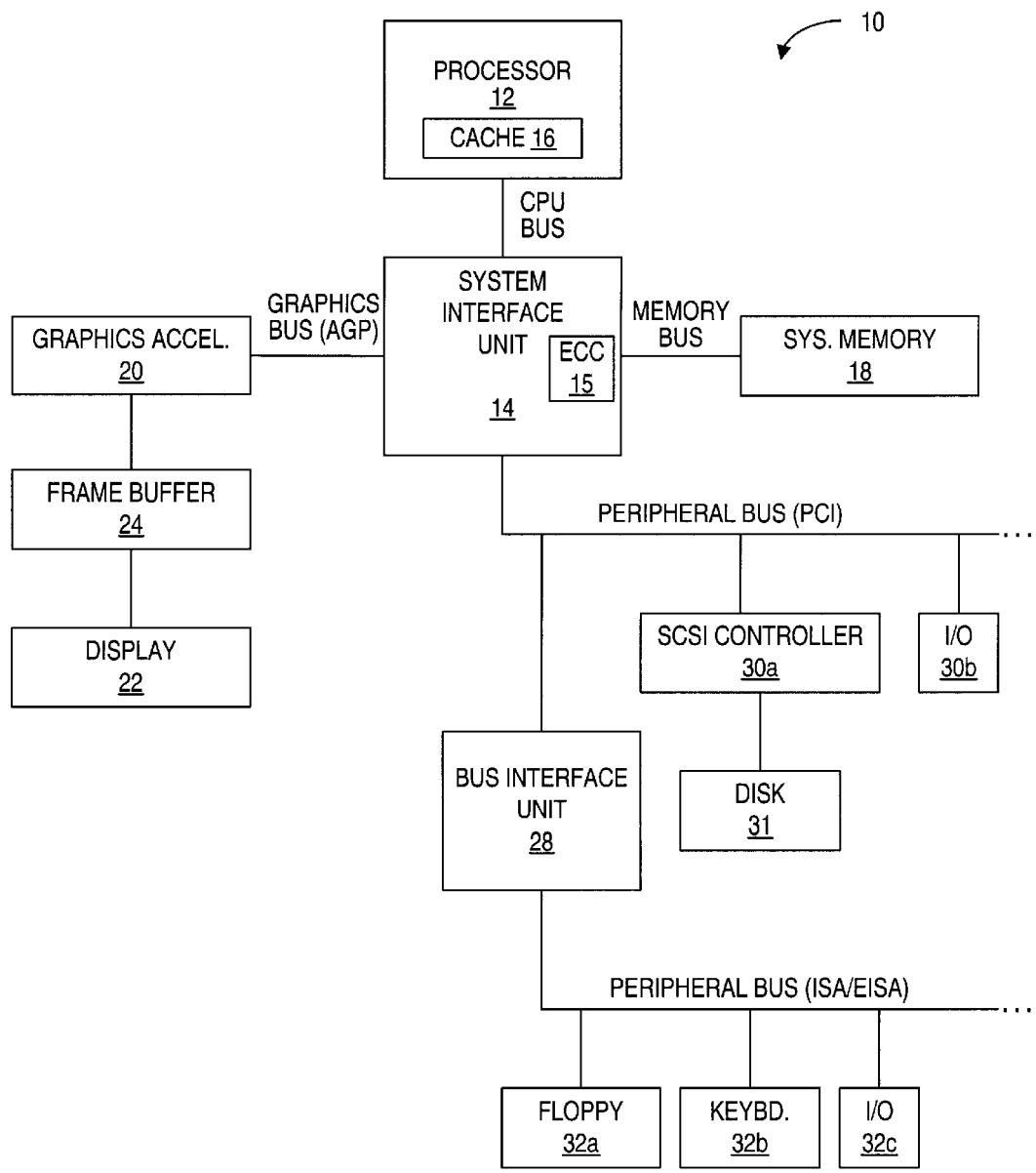
FIG. 1 is a block diagram of a computer system comprising various buses and a system interface unit having data integrity logic.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a computer 10 having multiple buses, including a CPU bus, a mezzanine or PCI bus, and a peripheral bus or ISA/EISA bus. The CPU bus connects a CPU or processor (or processors) 12 to a system interface unit or north bridge 14. A cache memory 16 is preferably embodied within processor 12 and/or linked to processor 12 by the CPU bus. System interface unit 14 provides an interface between components located on different buses. System interface unit 14 preferably contains a memory controller which allows communication to and from system memory 18. A suitable system memory 18 may comprises dynamic random access memory (DRAM), extended data out dynamic random access memory (EDO DRAM) synchronous dynamic random access memory (SDRAM) or other suitable memory devices. System interface unit 14 may also include a graphics port to allow communication to a graphics accelerator 20. A graphics port, such as AGP, provides a high performance, component level interconnect targeted at three dimensional graphics display applications and is based on performance extensions or enhancements to PCI. AGP interfaces are generally standard in the industry, the description of which is available from Intel Corporation.

Generally speaking, AGP is physically, logically, and electrically independent of the PCI bus and is intended for the exclusive use of a display device 22 coupled to the graphics port (AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

System interface unit 14 is generally considered an application specific chip set or application specific integrated circuit ("ASIC") that provides connectivity to various buses, and integrates other system functions such as the main memory interface and data integrity logic 15. System memory 18 is considered the main memory and refers to a portion of the addressable memory that typically the majority of memory accesses target. System memory is accessed via system interface unit 14, and is typically considered the largest continuous memory space of computer 10.

Data integrity logic 15 is included within system interface unit 14 to improve the integrity of data transfers between the various buses and main memory 18. Data integrity logic 15 is noted in FIG. 1 as providing error checking and correction (ECC). However, other data integrity methods may be employed such as parity or simple multi-bit error detection. Generally speaking, data integrity logic 15 generates error information as data is written into main memory 18. The error information is stored with the data. When data is read from main memory, data integrity logic 15 performs a data integrity protocol on the data and error information to detect and possibly correct any errors. Data integrity logic 15 may be distributed throughout system interface unit 14 at the various functional interfaces or it may be implemented as a separate functional unit within system interface unit 14.

Unlike the CPU bus which runs at speeds comparable to CPU 12, the PCI bus generally runs at speeds of, e.g., 33 MHz or lower, although it may run at higher speeds such as 60 or 66 MHz. Another bus interface unit 28 is coupled between two dissimilar peripheral buses (i.e., the PCI bus and the ISA/EISA bus). Similar to unit 14, unit 28 is an ASIC or group of ASICs that provide connectivity between various buses, and may also include system functions which can possibly integrate one or more serial ports, etc. Attributed to the PCI bus are input/output ("I/O") devices 30, one of which may be a SCSI controller link between, for example, a secondary disk drive and the PCI bus. I/O devices 30 generally operate at higher speeds than I/O devices 32, examples of which include a floppy disk drive, a keyboard, etc.

Figure 2:
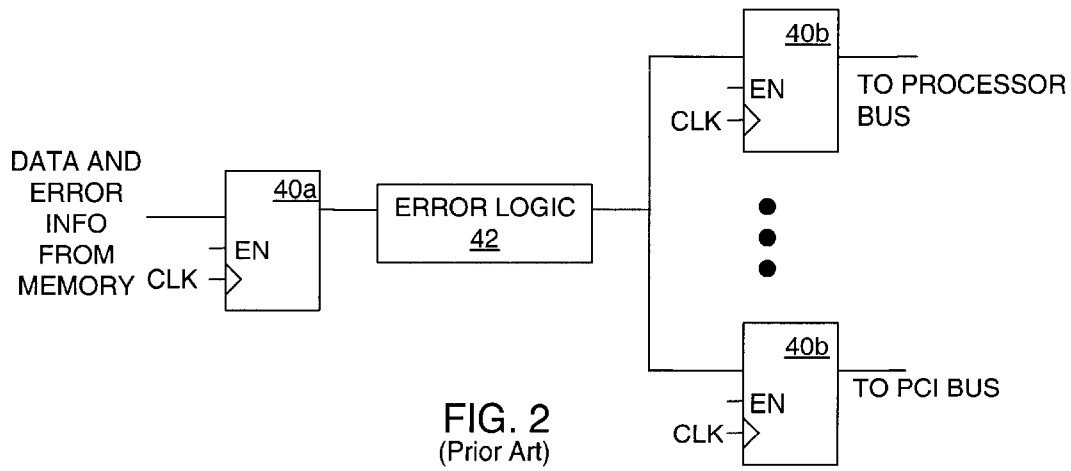
FIG. 2 is a block diagram of part of the data path in a conventional system interface unit employing data integrity functionality (error logic)

Turning to FIG. 2, a block diagram is provided illustrating part of the data path in system interface unit 14 according to a conventional embodiment. The data path includes error logic 42 which implements part of the data integrity function 15 shown in FIG. 1. FIG. 2 shows part of the read data path from main memory to the processor bus and to at least one peripheral bus such as a PCI bus.

After a device on the processor bus or a device on one of the peripheral buses issues a read request to main memory and the appropriate data and error bits are driven by the main memory 18, the data and error bits are latched in the system interface unit read data path by a latch 40a. Latch 40a may be implemented as D flip flops. The data path is 72 bits wide in a preferred embodiment with 64 bits of data (one quad word) and 8 bits of error information. In other embodiments the width of the data bus may vary, e.g., 32 data bits or 128 data bits, plus error bits.

After the data and error bits are latched in from main memory 18 by latch 40a, the data and error bits are passed through error logic 42. Error logic 42 performs a data integrity protocol such as parity or ECC on the data and error bits to determine if any errors are present. Error logic 42 may also correct some errors. After completion of the data integrity protocol, the data is routed to the output latches 40b for the processor and peripheral buses and on a subsequent clock, the data is driven onto the appropriate bus where the device that requested the read is located. As shown in FIG. 2, one clock cycle is required for error logic 42 to perform the data integrity protocol on the read data in which data is latched from latch 40a to latch 40b. At least one such pipeline stage is required for the data to pass through error logic 42 due to the complexity of data integrity protocols. Most data integrity protocols require several stages of combinatorial logic. It would not be possible to meet the read setup time of the requesting device on the processor or peripheral bus if the error logic was not pipelined. Depending upon the complexity of the data integrity protocol, more than one clock cycle may be required in the pipeline. For example, error logic 42 may be divided into error detection logic and error correction logic. If the combined delay time for these two functions is longer than one clock cycle, then another latch may need to be inserted between the error detection logic and the error correction logic. In that case the entire error logic function would take two clock cycles to perform. Thus, error logic 42 adds one or more clock cycles to the overall read latency.

Figure 3:
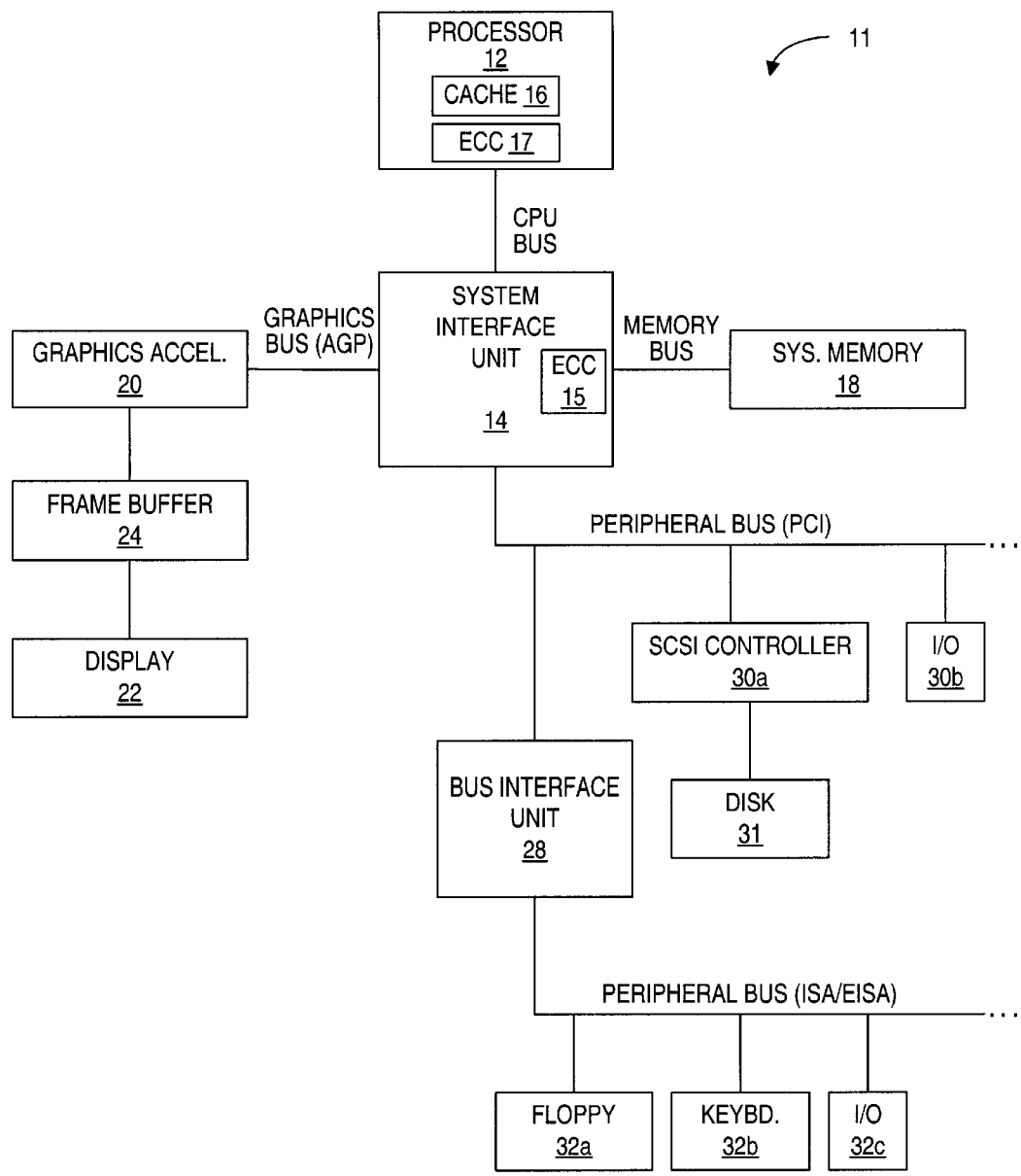
FIG. 3 is a block diagram of computer system comprising a processor bus supporting data integrity functionality and a system interface unit having data integrity logic.

Turning now to FIG. 3, a block diagram is provided illustrating a computer system 11 similar to that shown in FIG. 1. System interface unit 14 provides the interface between a CPU bus, memory bus, and one or more peripheral buses such as a PCI bus and graphics bus. System memory (main memory) 18 is coupled to the memory bus and may be comprised of DRAM, EDO DRAM, SDRAM, etc., on one or more SIMMs, DIMMS, or other suitable memory modules. The graphics bus may support the Advanced Graphics Port (AGP) standard and at least one graphics device such as graphics accelerator 20 is coupled to the graphics bus. Frame buffer 24 may be coupled between graphics accelerator 20 and a display 22 such as a CRT. Frame buffer 24 may be memory for storing the image to be displayed on display 22. Graphics Accelerator 20 and frame buffer 24 may be implemented on a separate circuit board that plugs into a connector to the graphics bus or they may be implemented on the motherboard that includes system interface unit 14.

At least one processor 12 is coupled to the processor bus. Processor 12 includes cache memory 16 which may include both a first and second level cache. Some or all of cache 16 may be integrated with processor 12. Processor 12 also includes data integrity logic 17 which allows processor 12 to detect and possibly correct errors on read data and to generate error information bits for write data. Data integrity logic 17 may perform any data integrity protocol as is known in the art. FIG. 3 indicates that data integrity logic 17 performs error checking and correction (ECC). The Pentiume® Pro (P6) microprocessor from Intel Corporation is an example of a processor that includes a specific error checking and correction functionality.

The peripheral bus may be a peripheral component interconnect (PCI) bus which may connect I/O devices 30a such as a SCSI controller and hard drive 31 to the system interface unit 14 which interfaces the PCI devices to the memory, processor, and graphics buses. Bus interface unit 28 interfaces the PCI bus to another peripheral bus such as another PCI bus or an industry standard architecture (ISA) or extended industry standard architecture (EISA) bus. Other I/O devices 32a may be connected to this bus, such as a floppy drive. It is understood that the system configuration shown in FIG. 3 is merely an example. Other configurations, devices, and buses as known in the art may be employed within the scope of the present invention.

Figure 4:
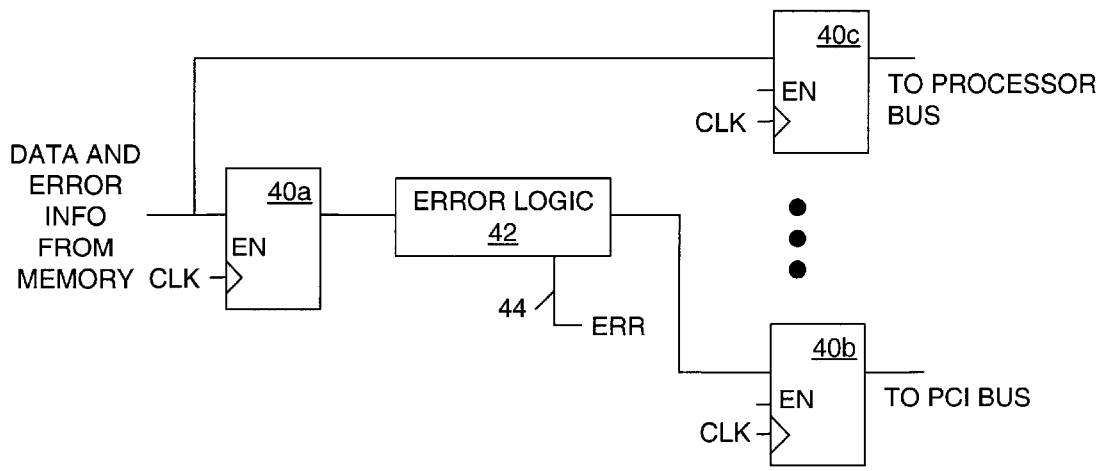
FIG. 4 is a block diagram of part of the data path in a system interface unit employing data integrity functionality (error logic) and improved processor read latency.

Turning now to FIG. 4, a block diagram is provided illustrating part of the read data path in system interface unit 14 according to one embodiment. In response to a read request, data and error information are received from main memory. The data and error information are synchronously latched by latch 40a and provided to error logic 42. Error logic 42 performs a data integrity protocol such as parity or ECC on the data and error bits to determine if any errors are present. Error logic 42 may also correct some errors. After completion of the data integrity protocol, the data is routed to the output latches 40b for the peripheral buses. As shown in FIG. 4, one clock cycle is required for error logic 42 to perform the data integrity protocol on the read data in which data is latched from latch 40a to latch 40b. When read data and error information are received from main memory, the read data and error information are also passed unmodified to latch 40c coupled to the processor bus. This path bypasses error logic 42 and thus does not incur the one (or more) clock cycle penalty required to perform the data integrity protocol. The read data is provided to the appropriate bus that requested the read. The control logic for performing the address decoding and other routing and other data path elements, such as queues, are not shown for the sake of simplicity.

The data path structure of FIG. 4 allows one or more clock cycles to be removed from the read latency to the processor bus since the processor bus read path bypasses error logic 42. However, data integrity is not compromised because processor 12 on the processor bus contains its own data integrity logic 17 as shown in FIG. 3. System interface unit 14 passes the read and error information unmodified to the processor bus and processor 12 performs the data integrity protocol. Therefore, processor read latency is improved by at least one clock and the data integrity function is still performed. Furthermore, system interface unit 14 still performs the data integrity function on the same read data and error information supplied to the processor in parallel with the processor performing the data integrity function. As can been seen from the data paths in FIG. 4, read data and error information are sent to both the processor out latch 40c and through latch 40a to error logic 42. Therefore, system interface unit 14 and processor 12 perform the data integrity protocol in parallel. In this manner, system interface unit 14 may still track errors on processor reads but without negatively affecting processor read latency.

If an error is detected, error logic 42 may assert error signal 44. Error signal 44 may be used to log errors and/or generate an interrupt to alert the operating system to the occurrence of an error. The number of errors may be recorded for future reference and compared to a threshold setting that signals when to replace a memory module (e.g., DIMM). Error information indicated by error signal 44 may be stored in a register that is accessible by software for polling purposes.

Figure 5:
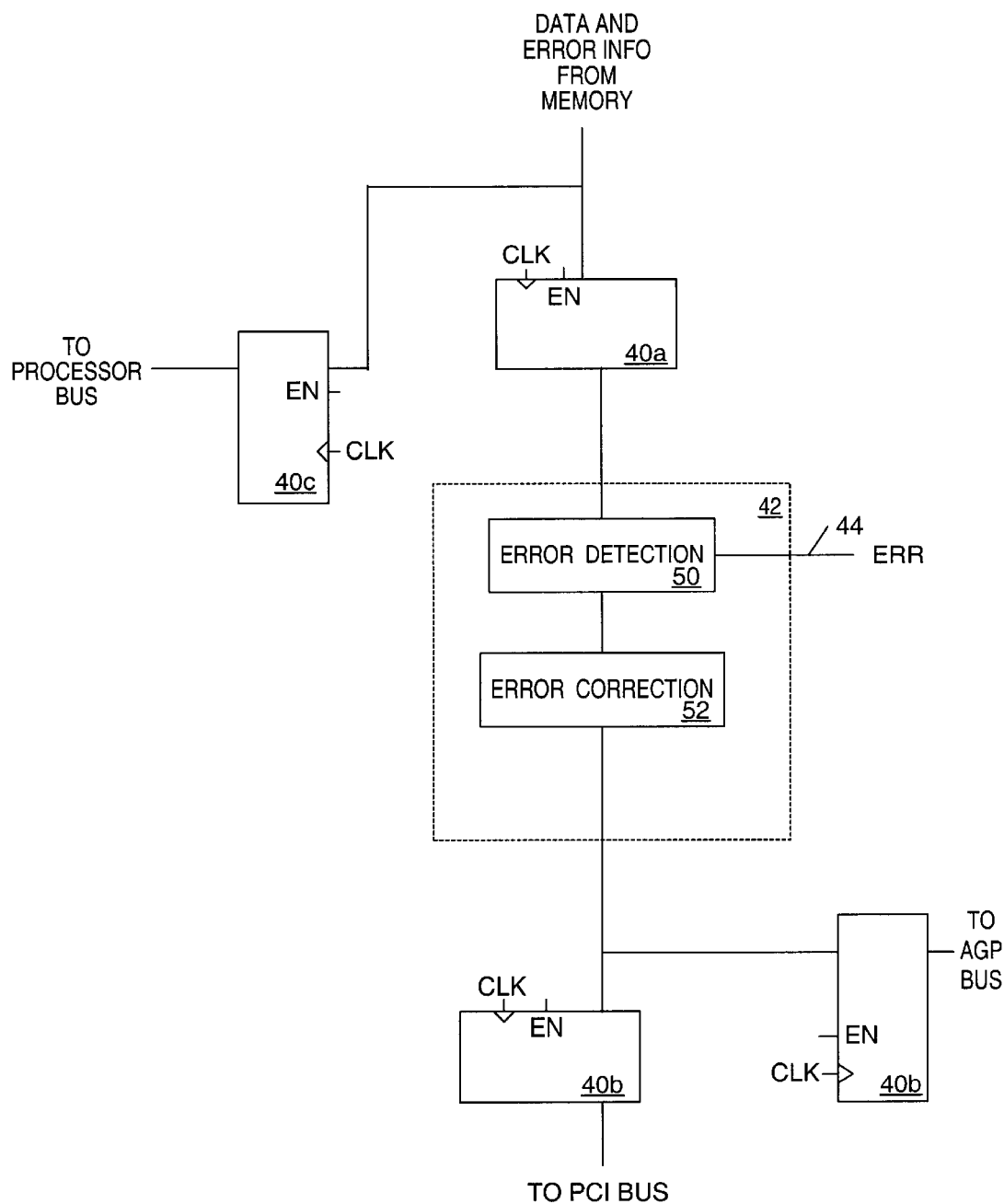
FIG. 5 is a detailed block diagram of part of the data path in a system interface unit coupling multiple buses and employing data integrity functionality (error logic) and improved processor read latency.

Turning now to FIG. 5, a block diagram of one embodiment is illustrated. FIG. 5 shows part of the read data path in system interface unit 14. Data and error information are received from main memory 18 and routed to processor bus latch 40c and to error logic latch 40a. If the read request originated from the processor bus, the read data and error information may be forwarded unmodified to the processor bus without incurring the extra latency of going through error logic 42. If the read request originated on the AGP bus or the PCI bus then the read request incurs the latency of passing through error logic 42. However, read data and error information resulting from processor read requests also pass through error logic 42 so that system interface unit 14 and processor 12 both may perform the same data integrity protocol in parallel. Since devices on the AGP and PCI buses typically do not support the data integrity protocol, their read data must pass through error logic 42 before being forwarded to the requesting bus (AGP or PCI).

Error logic 42 may include error detection logic 50 and error correction logic 52. Error detection logic may generate error signal 44 for tracking errors. Any data integrity protocol may be employed, however, the data integrity protocol used by processor bus devices and system interface unit 14 must be the same since they each may generate error information encoded according to the protocol for data to be stored in main memory. For example, a typical ECC algorithm may generate eight checkbits of error information for a 64 bit data quadword. Error detection logic 50 checks the 72 bits (64 data bits and 8 checkbit) read from main memory and determines if the data contains an error. Most ECC algorithms can detect single bit errors as well as double bit and perhaps three or four bit errors. Error correction logic 52 may use the error information to correct single bit errors. Typically, multiple bit errors cannot be corrected. Therefore, error signal 44 may also indicate if the error is a single bit or multi-bit error.

The data integrity algorithm used for error detection and correction according to one embodiment was developed by Intel and is an enhanced ECC algorithm. This algorithm is able to detect and correct all single bit errors, detect all double bit errors, and all 3 and 4 bit errors within a nibble (four bit section of data). This detection and correction is within the 64 bits of data and the 8 check bits. In order to achieve 3 and 4 bit error detection within a nibble, and not map these errors onto other single bit errors, the nibbles are created by mixing the check bits in with the data. See Table 1 for how the nibbles are created.

TABLE 1

Table of Nibbles

| NIBBLE | DATA/CHECK BITS COMPRISING THE NIBBLE | | | |
|---|---|---|---|---|
| NIBBLE0 | DATA0 | DATA1 | DATA2 | DATA3 |
| NIBBLE1 | DATA4 | DATA5 | DATA6 | DATA7 |
| NIBBLE2 | DATA8 | DATA9 | DATA10 | DATA11 |
| NIBBLE3 | DATA12 | DATA13 | DATA14 | DATA15 |

TABLE 1-continued

Table of Nibbles

| NIBBLE | DATA/CHECK BITS COMPRISING THE NIBBLE | | | |
|---|---|---|---|---|
| NIBBLE4 | DATA16 | DATA17 | DATA18 | DATA19 |
| NIBBLE5 | DATA20 | DATA21 | DATA22 | DATA23 |
| NIBBLE6 | DATA24 | DATA25 | CHECKBIT2 | CHECKBIT5 |
| NIBBLE7 | DATA26 | DATA27 | DATA28 | DATA29 |
| NIBBLE8 | DATA30 | DATA31 | CHECKBIT3 | CHECKBIT4 |
| NIBBLE9 | DATA32 | DATA33 | DATA34 | DATA35 |
| NIBBLE10 | DATA36 | DATA37 | DATA38 | DATA39 |
| NIBBLE11 | DATA40 | DATA41 | DATA42 | DATA43 |
| NIBBLE12 | DATA44 | DATA45 | DATA46 | DATA47 |
| NIBBLE13 | DATA48 | DATA49 | DATA50 | DATA51 |
| NIBBLE14 | DATA52 | DATA53 | DATA54 | DATA55 |
| NIBBLE15 | DATA56 | DATA57 | CHECKBIT6 | CHECKBIT1 |
| NIBBLE16 | DATA58 | DATA59 | DATA60 | DATA61 |
| NIBBLE17 | DATA62 | DATA63 | CHECKBIT7 | CHECKBIT0 |

System interface unit 14 may have several modes for handling ECC. One mode allows ECC to be turned off. The modes may be selected by programming a register within system interface unit 14. If ECC is on, the memory controller portion (not shown in the drawings) of system interface unit 14 knows that any non-quadword write needs to be changed into a read-modify-write. This is done because the check bits are generated off the entire quadword and with new data, so the check bits require updating. System interface unit 14 may be programmed to either correct single bit errors for reads or read-modify-writes that are detected, or just flag the detected errors. If ECC is off (or is turned off), data integrity checking is not performed. If ECC is then turned on, it may be necessary to ensure that check bits previously written to memory have not been corrupted while ECC was off.

The check bits are generated in system interface unit 14 as write data is received from the various buses. To assist in meeting the timing requirements of the computer system 11, the checkbit equations (listed below) may be implemented in four different places: 1) out of a processor write data buffer before it is placed in a processor to memory queue 2) out of a PCI write data buffer before it is placed in a PCI to memory queue 3) just before the read data of a read-modify-write is placed in a read-modify-write queue and 4) out of a graphics write data buffer before it is placed in a graphics to memory queue.

The check bits are created by the following equations. The function represented by the "^" symbol in the following equations is the exclusive OR (XOR) function.

```
checkbit[0] =    data[0]^data[4]^data[8]^data[12]^data[16]^data[20]^
                 data[25]^data[29]^data[30]^data[31]^data[40]^data[41]^
                 data[42]^data[43]^data[48]^data[49]^data[50]^data[51]^
                 data[52]^data[53]^data[54]^data[55]^data[56]^data[58]^
                 data[59]^data[62];
checkbit[1] =    data[1]^data[5]^data[9]^data[13]^data[17]^data[21]^
                 data[25]^data[28]^data[29]^data[31]^data[36]^data[37]^
                 data[38]^data[39]^data[44]^data[45]^data[46]^data[47]^
                 data[52]^data[53]^data[54]^data[55]^data[56]^data[58]^
                 data[62]^data[63];
checkbit[2] =    data[2]^data[6]^data[10]^data[14]^data[18]^data[22]^
                 data[25]^data[28]^data[31]^data[32]^data[33]^data[34]^
                 data[35]^data[44]^data[45]^data[46]^data[47]^data[48]^
                 data[49]^data[50]^data[51]^data[56]^data[57]^data[58]^
                 data[59]^data[62];
checkbit[3] =    data[3]^data[7]^data[11]^data[15]^data[19]^data[23]^
                 data[24]^data[25]^data[28]^data[29]^data[31]^data[32]^
                 data[33]^data[34]^data[35]^data[36]^data[37]^data[38]^
                 data[39]^data[40]^data[41]^data[42]^data[43]^data[56]^
                 data[59]^data[62];
checkbit[4] =    data[8]^data[9]^data[10]^data[11]^data[16]^data[17]^
                 data[18]^data[19]^data[20]^data[21]^data[22]^data[23]^
                 data[24]^data[26]^data[27]^data[30]^data[32]^data[36]^
                 data[40]^data[44]^data[48]^data[52]^data[57]^data[61]^
                 data[62]^data[63];
checkbit[5] =    data[4]^data[5]^data[6]^data[7]^data[12]^data[13]^
                 data[14]^data[15]^data[20]^data[21]^data[22]^data[23]^
                 data[24]^data[26]^data[30]^data[31]^data[33]^data[37]^
                 data[41]^data[45]^data[49]^data[53]^data[57]^data[60]^
                 data[61]^data[63];
checkbit[6] =    data[0]^data[1]^data[2]^data[3]^data[12]^data[13]^data[14]^
                 data[15]^data[16]^data[17]^data[18]^data[19]^data[24]^
                 data[25]^data[26]^data[27]^data[30]^data[34]^data[38]^
                 data[42]^data[46]^data[50]^data[54]^data[57]^
                 data[60]^data[63];
checkbit[7] =    data[0]^data[1]^data[2]^data[3]^data[4]^data[5]^
                 data[6]^data[7]^data[8]^data[9]^data[10]^data[11]^
                 data[24]^data[27]^data[30]^data[35]^data[39]^data[43]^
                 data[47]^data[51]^data[55]^data[56]^data[57]^data[60]^
                 data[61]^data[63];
```

When all data is read in from memory, errors are checked for by generating a syndrome with the following equations. The function represented by the "^" symbol in the following equations is the exclusive OR (XOR) function.

```
syndrome[0] =    data[0]^data[4]^data[8]^data[12]^data[16]^data[20]^data[25]^
                 data[29]^data[30]^data[31]^data[40]^data[41]^data[42]^data[43]^
                 data[48]^data[49]^data[50]^data[51]^data[52]^data[53]^data[54]^
                 data[55]^data[56]^data[58]^data[59]^data[62]^checkbit[64];
syndrome[1] =    data[1]^data[5]^data[9]^data[13]^data[17]^data[21]^data[25]^
                 data[28]^data[29]^data[31]^data[36]^data[37]^data[38]^data[39]^
                 data[44]^data[45]^data[46]^data[47]^data[52]^data[53]^data[54]^
                 data[55]^data[56]^data[58]^data[62]^data[63]^checkbit[65];
syndrome[2] =    data[2]^data[6]^data[10]^data[14]^data[18]^data[22]^data[25]^
                 data[28]^data[31]^data[32]^data[33]^data[34]^data[35]^data[44]^
                 data[45]^data[46]^data[47]^data[48]^data[49]^data[50]^data[51]^
                 data[56]^data[57]^data[58]^data[59]^data[62]^checkbit[66];
syndrome[3] =    data[3]^data[7]^data[11]^data[15]^data[19]^data[23]^data[24]^
                 data[25]^data[28]^data[29]^data[31]^data[32]^data[33]^data[34]^
                 data[35]^data[36]^data[37]^data[38]^data[39]^data[40]^data[41]^
                 data[42]^data[43]^data[56]^data[59]^data[62]^checkbit[67];
syndrome[4] =    data[8]^data[9]^data[10]^data[11]^data[16]^data[17]^data[18]^
                 data[19]^data[20]^data[21]^data[22]^data[23]^data[24]^data[26]^
                 data[27]^data[30]^data[32]^data[36]^data[40]^data[44]^data[48]^
                 data[52]^data[57]^data[61]^data[62]^data[63]^checkbit[68];
syndrome[5] =    data[4]^data[5]^data[6]^data[7]^data[12]^data[13]^data[14]^
                 data[15]^data[20]^data[21]^data[22]^data[23]^data[24]^data[26]^
                 data[30]^data[31]^data[33]^data[37]^data[41]^data[45]^data[49]^
                 data[53]^data[57]^data[60]^data[61]^data[63]^checkbit[69];
syndrome[6] =    data[0]^data[1]^data[2]^data[3]^data[12]^data[13]^data[14]^
                 data[15]^data[16]^data[17]^data[18]^data[19]^data[24]^data[25]^
                 data[26]^data[27]^data[30]^data[34]^data[38]^data[42]^data[46]^
```

-continued $$\text{syndrome}[7] = \begin{array}{l}\text{data}[50]\char`\^\text{data}[54]\char`\^\text{data}[57]\char`\^\text{data}[60]\char`\^\text{data}[63]\char`\^\text{checkbit}[70];\\ \text{data}[0]\char`\^\text{data}[1]\char`\^\text{data}[2]\char`\^\text{data}[3]\char`\^\text{data}[4]\char`\^\text{data}[5]\char`\^\text{data}[6]\char`\^\\ \text{data}[7]\char`\^\text{data}[8]\char`\^\text{data}[9]\char`\^\text{data}[10]\char`\^\text{data}[11]\char`\^\text{data}[24]\char`\^\text{data}[27]\char`\^\\ \text{data}[30]\char`\^\text{data}[35]\char`\^\text{data}[39]\char`\^\text{data}[43]\char`\^\text{data}[47]\char`\^\text{data}[51]\char`\^\text{data}[55]\char`\^\\ \text{data}[56]\char`\^\text{data}[57]\char`\^\text{data}[60]\char`\^\text{data}[61]\char`\^\text{data}[63]\char`\^\text{checkbit}[71];\end{array}$$

If the syndrome is zero, either there is no error or there are too many errors to detect. In one embodiment it may be assumed there is no error if the syndrome is zero. If the syndrome is not zero, an error has occurred. Table 2 shows all single bit errors and the bit that is in error for a given syndrome. Bits are listed in Table 2 in decimal and the syndromes are listed in hexadecimal. If a syndrome is generated that is not in this table, then a multi-bit error has occurred. Note that errors in checkbit locations may be ignored and are not reflected in Table 2. When enabled, all single bit errors found from a read (other than a processor read) and on read-modify-writes are corrected. It is left to the processor to correct single bit errors found in processor reads. When ECC is on (no matter if correction is enabled or not) a flag may be set for all detected errors.

integrity functionality. A device on a processor or peripheral bus issues a read request, as indicated by step 70. The read data and associated error information is provided by main memory and received in the system interface unit, as indicated at step 72. If the read request was from a device on the processor bus then it is known that that device may perform the data integrity function itself. Therefore, the data and error bits are forwarded to the processor bus bypassing the data integrity logic in the system interface unit, as indicated at steps 74 and 76. This allows processor read data to be supplied to the processor bus at least one clock faster than if the data passed through the system interface unit data integrity logic.

Regardless of who requested the read, the data integrity function is performed on the read data and error bits in the

TABLE 2

Table of Errors

| BIT | SYNDROME | BIT | SYNDROME | BIT | SYNDROME | BIT | SYNDROME |
|---|---|---|---|---|---|---|---|
| 0 | C1 | 1 | C2 | 2 | C4 | 3 | C8 |
| 4 | A1 | 5 | A2 | 6 | A4 | 7 | A8 |
| 8 | 91 | 9 | 92 | 10 | 94 | 11 | 98 |
| 12 | 61 | 13 | 62 | 14 | 64 | 15 | 68 |
| 16 | 51 | 17 | 52 | 18 | 54 | 19 | 58 |
| 20 | 31 | 21 | 32 | 22 | 34 | 23 | 38 |
| 24 | F8 | 25 | 4F | 26 | 70 | 27 | D0 |
| 28 | 0E | 29 | 0B | 30 | F1 | 31 | 2F |
| 32 | 1C | 33 | 2C | 34 | 4C | 35 | 8C |
| 36 | 1A | 37 | 2A | 38 | 4A | 39 | 8A |
| 40 | 19 | 41 | 29 | 42 | 49 | 43 | 89 |
| 44 | 16 | 45 | 26 | 46 | 46 | 47 | 86 |
| 48 | 15 | 49 | 25 | 50 | 45 | 51 | 85 |
| 52 | 13 | 53 | 23 | 54 | 43 | 55 | 83 |
| 56 | 8F | 57 | 4F | 58 | 07 | 59 | 0D |
| 60 | E0 | 61 | B0 | 62 | 1F | 63 | F2 |

Figure 6:
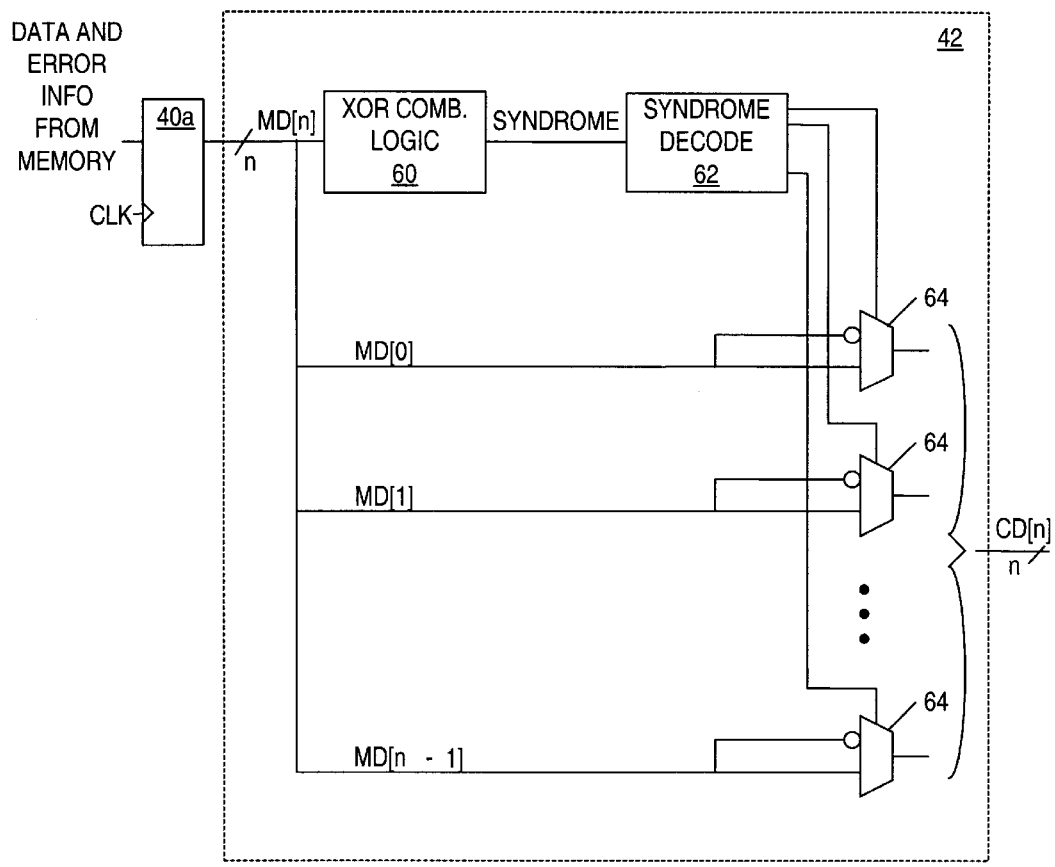
FIG. 6 is a detailed block diagram of error logic in a system interface unit according to one embodiment.

Turning now to FIG. 6, a block diagram of error logic 42 is illustrated according to one embodiment. Exclusive OR (XOR) combinatorial logic 60 generates the syndrome bits from the read data and checkbits received from main memory 18 though latch 40*a*. The syndrome bits are decoded by syndrome decode logic 62 according to Table 2 in one embodiment. If the syndrome decode logic determines that an error has occurred, error signal 44 (not shown in FIG. 6) may be generated to indicate the occurrence of an error and whether it was a single bit or multi-bit error. If the error was a single bit error, the location of the error is known according to Table 2. Therefore, syndrome decode logic 62 may direct the appropriate multiplexor 64 to correct the single bit error by flipping the erroneous bit. The corrected data is then provided to the peripheral and graphic bus output latches and/or queues. XOR combinatorial logic 60 and syndrome decode logic 62 may correspond to error detection logic 50 and part of syndrome decode logic 62 and multiplexors 64 may correspond to error correction logic 52.

Figure 7:
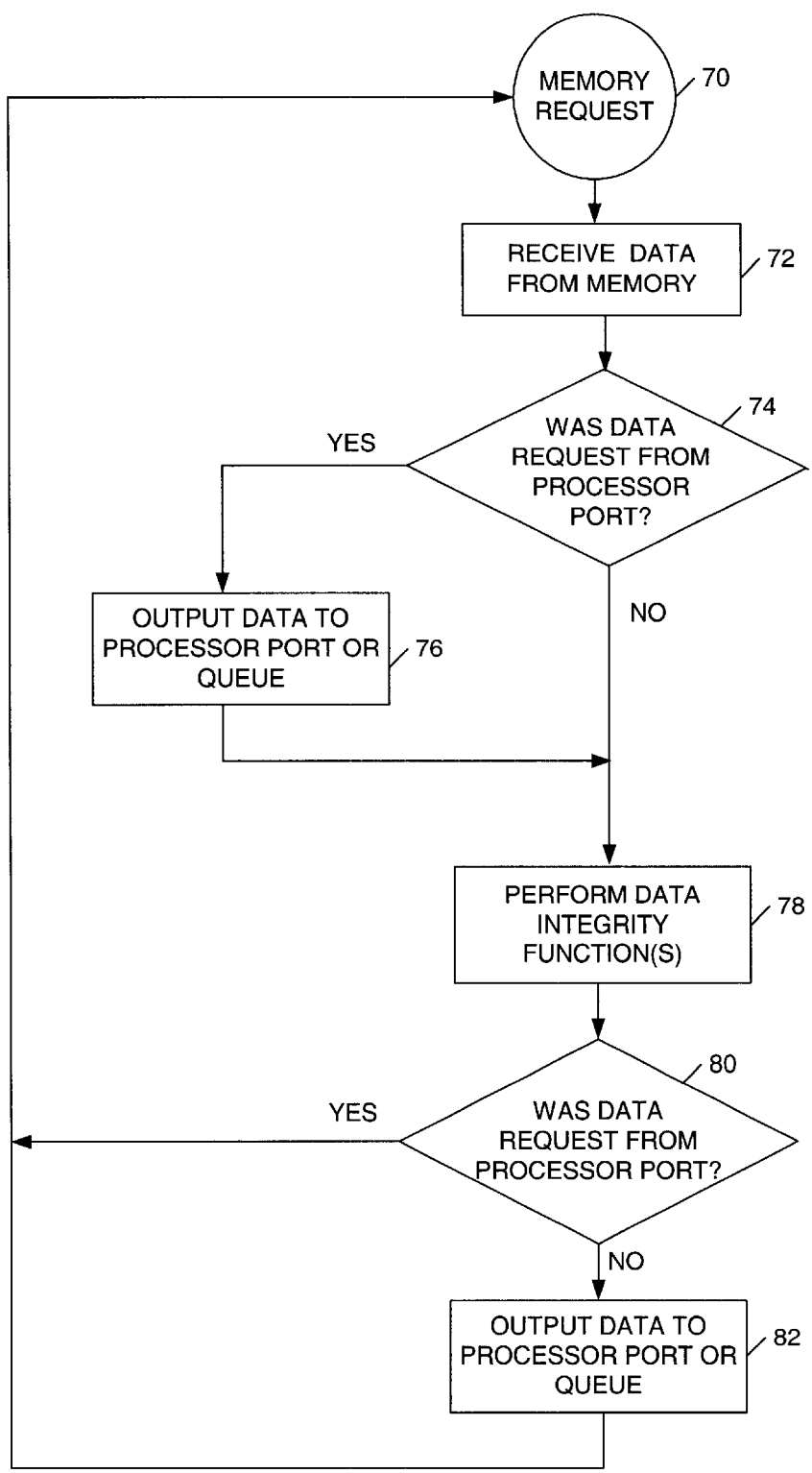
FIG. 7 is a flow diagram of steps involved in a method for improving processor read latency in a computer system employing data integrity functionality.

Turning now to FIG. 7, a flow diagram is provided illustrating steps involved in a method for improving processor read latency in a computer system employing data system interface unit, as indicated by step 78. The data integrity function of step 78 may include both error detection and correction. Any errors may be logged and an interrupt may be generated on any errors. If the request was from a device on the processor bus, the corrected data is not forwarded to the processor bus output queue since the data was already so forwarded, as indicated at step 80. The processor bus device performs the data integrity function in parallel with the system interface unit. If the read request was from a non-processor bus device, such as a graphics or PCI device, the data is forwarded to the peripheral bus latches and then to the appropriate queue to be output to the requesting device, as indicated at step 82.

It will be appreciated to those skilled in the art having the benefit of this disclosure that a device according to this disclosure is believed to be capable of performing improved processor read latency in computer systems employing data integrity functionality. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer, comprising:
   at least one processor coupled to a processor bus, said processor having data integrity logic for performing a data integrity protocol;
   main memory;
   a system interface unit having error logic for performing said data integrity protocol on read data and error information received from said main memory without passing on said processor bus, wherein said system interface unit is coupled to said processor bus, said main memory, and a first peripheral bus, and wherein said system interface unit is configured to pass read data and error information from said main memory to said processor bus without passing through said error logic and to pass read data and error information from said main memory to said first peripheral bus through said error logic; and
   a hard drive coupled to said first peripheral bus.

2. The computer as recited in claim 1, wherein said error logic in said system interface unit performs said data integrity protocol on read data and error information from said main memory that has been passed to said processor bus in parallel with the processor that receives the read data and error information.

3. The computer as recited in claim 1, wherein said system interface unit passes read data to said processor bus at least one clock faster than if the read data had been passed through said error logic before being passed to said processor bus.

4. The computer as recited in claim 1, wherein said error logic includes error detection logic and error correction logic.

5. The computer as recited in claim 1, wherein said data integrity protocol is the Pentium® Pro data integrity protocol.

6. The computer as recited in claim 1, wherein said first peripheral bus comprises the Peripheral Component Interconnect (PCI) bus.

7. The computer as recited in claim 1, wherein said system interface unit is further coupled to a second peripheral bus and passes read data and error information from said main memory to said second peripheral bus through said error logic.

8. The computer as recited in claim 7, wherein said second peripheral bus comprises an Advanced Graphics Port (AGP).

9. The computer as recited in claim 7, wherein said system interface unit passes read data through queues to said processor and first and second peripheral buses so that data may be passed concurrently to said processor and first and second peripheral buses.

10. The computer as recited in claim 1, wherein said error logic generates an error signal for tracking errors and alerting software to the occurrence of errors.

11. A method for improving processor read latency in a computer system employing a data integrity function, the method comprising:
    receiving in a system interface unit read data and error information from main memory in response to a read request;
    if the read request was from a device on a processor bus, passing the read data and error information to the processor bus before the data integrity function is performed in the system interface unit; and
    if the read request was from a device on a peripheral bus, performing the data integrity function on the read data and error information in the system interface unit, wherein the data integrity function is performed on the read data and error information without the read data and error information having passed on the processor bus from main memory, and passing read data to the peripheral bus after said performing.

12. The method as recited in claim 11, wherein said performing comprises performing error detection and error correction.

13. The method as recited in claim 11, wherein the data integrity function comprises the Pentium® Pro error checking and correction protocol.

14. The method as recited in claim 11, further comprising performing the data integrity function in a processor on the read data and error information parallel to performing the data integrity protocol in the system interface unit on the same read data and error information if the read request is from a device on the processor bus.

15. The method as recited in claim 11, wherein the peripheral bus is the Peripheral Component Interconnect (PCI) bus.

16. The method as recited in claim 11, further comprising passing read data to a second peripheral bus after said performing if the read request was from a device on the second peripheral bus.

17. The method as recited in claim 16, wherein the second peripheral bus comprises the Advanced Graphics Port (AGP).

18. The method as recited in claim 11, wherein said passing the read data and error information to the processor bus occurs at least one clock cycle faster than if the data integrity function was not bypassed.

19. The method as recited in claim 11, further comprising generating a signal for tracking errors and alerting software to the occurrence of errors.

* * * * *